United States Patent
Vandermeijden et al.

(10) Patent No.: US 11,960,681 B2
(45) Date of Patent: Apr. 16, 2024

(54) CORRECTING TOUCH INTERFERENCE FOR ACTIVE PEN

(71) Applicant: Synaptics Incorporated, San Jose, CA (US)

(72) Inventors: Tom Vandermeijden, San Jose, CA (US); Guozhong Shen, San Jose, CA (US); Ching-Hsung Wang, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 17/750,292

(22) Filed: May 20, 2022

(65) Prior Publication Data

US 2023/0027365 A1 Jan. 26, 2023

Related U.S. Application Data

(60) Provisional application No. 63/224,368, filed on Jul. 21, 2021.

(51) Int. Cl.
G06F 3/041 (2006.01)
G06F 3/0354 (2013.01)
G06F 3/044 (2006.01)

(52) U.S. Cl.
CPC ...... *G06F 3/04186* (2019.05); *G06F 3/03545* (2013.01); *G06F 3/0442* (2019.05); *G06F 3/0446* (2019.05)

(58) Field of Classification Search
None
See application file for complete search history.

(56) References Cited

U.S. PATENT DOCUMENTS

| | | | |
|---|---|---|---|
| 10,963,098 B1* | 3/2021 | Zoubir | G06F 3/04186 |
| 2012/0050221 A1* | 3/2012 | Kolokowsky | G06F 3/0445 |
| | | | 345/174 |
| 2013/0106740 A1* | 5/2013 | Yilmaz | G06F 3/0418 |
| | | | 345/173 |
| 2015/0338932 A1* | 11/2015 | Pant | G06F 3/03545 |
| | | | 345/174 |
| 2016/0179243 A1* | 6/2016 | Schwartz | G06F 3/0446 |
| | | | 345/174 |

OTHER PUBLICATIONS

USI_Universal Stylus Initiative, "Stylus and DeviceTechnical Specification 1.0"; Jun. 30, 2016 (181 pages).
USI_Universal Stylus Initiative, "Stylus and Device Technical Specification 1.0—Errata 1.06"; Jun. 7, 2019 (44 pages).

* cited by examiner

*Primary Examiner* — Kirk W Hermann
(74) *Attorney, Agent, or Firm* — Leydig, Voit & Mayer, Ltd.

(57) ABSTRACT

A method of capacitive sensing includes obtaining a capacitive touch profile from multiple receiver electrodes disposed in a sensing region of an input device and obtaining an active pen profile, different from the capacitive touch profile, from the multiple receiver electrodes. The method also includes adjusting, using the capacitive touch profile, the active pen profile to obtain a corrected active pen profile and determining a position of an active pen in the sensing region, using the corrected active pen profile.

17 Claims, 10 Drawing Sheets

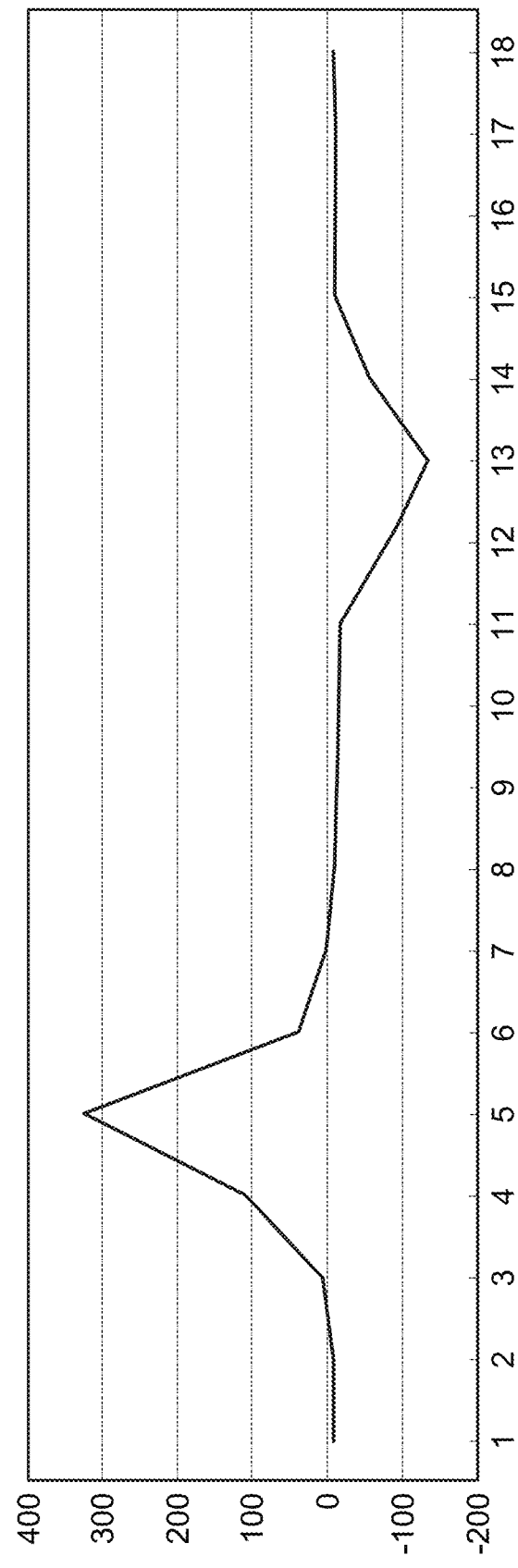

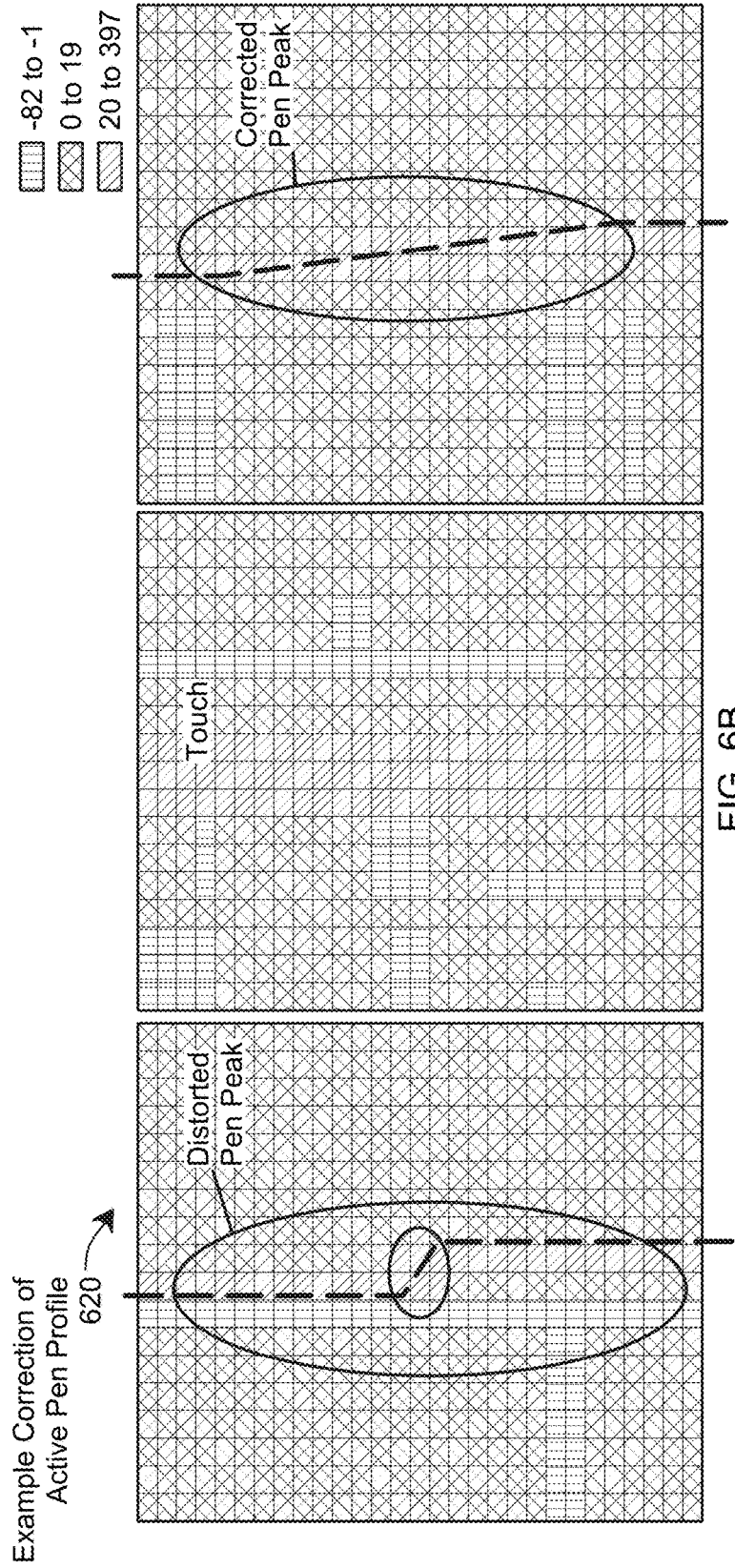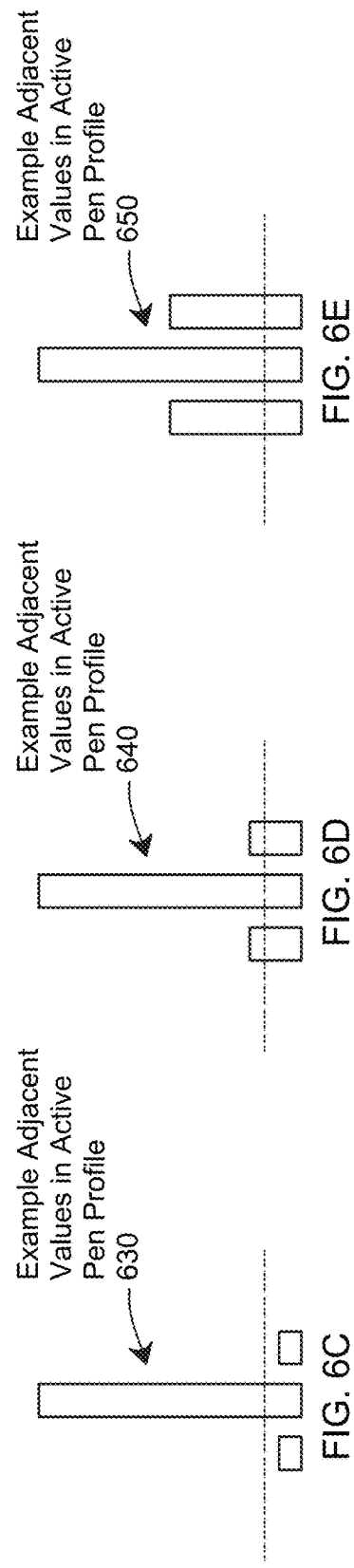
FIG. 6B
FIG. 6C
FIG. 6D
FIG. 6E ions. The use of such ordinal numbers does not imply or create any particular ordering of the elements nor to limit any element to being only a single element unless expressly disclosed, such as by the use of the terms "before", "after", "single", and other such terminol-

CORRECTING TOUCH INTERFERENCE FOR ACTIVE PEN

CROSS REFERENCE TO RELATED APPLICATIONS

This application is a non-provisional application of, and therefore, claims benefit under 35 U.S.C. 119(e), to U.S. Patent Application Ser. No. 63/224,368, filed on Jul. 21, 2021. U.S. Patent Application Ser. No. 63/224,368 is incorporated by reference in its entirety.

TECHNICAL FIELD

The described embodiments relate generally to electronic devices, and more specifically, to improving the performance of capacitive imaging sensors when used in conjunction with active pens in presence of touch.

BACKGROUND

Input devices including proximity sensor devices (e.g., touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Proximity sensor devices utilize one or more electrical techniques, such as a capacitive sensing technique, to determine the presence, location and/or motion of an input object. The proximity sensor devices often use an array of sensor electrodes arranged in a sensor pattern to detect the presence, location and/or motion of an input object.

An input object may be a finger, an active pen, etc. Multiple input objects may be simultaneously used in conjunction with a proximity sensor device. For example, a finger or a palm may rest on the surface of the proximity sensor device, while input may be provided with an active pen. The presence of the finger or palm may cause touch interference, resulting in a degradation of the input provided by the active pen.

Therefore, it is desirable to provide methods and systems to address the touch interference.

SUMMARY

In general, in one aspect, one or more embodiments relate to a method of capacitive sensing. The method includes obtaining a capacitive touch profile from multiple receiver electrodes disposed in a sensing region of an input device and obtaining an active pen profile, different from the capacitive touch profile, from the multiple receiver electrodes. The method also includes adjusting, using the capacitive touch profile, the active pen profile to obtain a corrected active pen profile and determining a position of an active pen in the sensing region, using the corrected active pen profile.

In another aspect, one or more embodiments relate to an input device that includes multiple receiver electrodes disposed in a sensing region and a processing system. The processing system is configured to obtain a capacitive touch profile from the multiple receiver electrodes and obtain an active pen profile, different from the capacitive touch profile, from the multiple receiver electrodes. The processing system is further configured to adjust, using the capacitive touch profile, the active pen profile to obtain a corrected active pen profile and to determine a position of an active pen in the sensing region, using the corrected active pen profile.

In another aspect, one or more embodiments relate to a processing system, configured to obtain a capacitive touch profile from multiple receiver electrodes disposed in a sensing region of an input device and to obtain an active pen profile, different from the capacitive touch profile, from the multiple receiver electrodes. The processing system is further configure to adjust, using the capacitive touch profile, the active pen profile to obtain a corrected active pen profile and to determine a position of an active pen in the sensing region, using the corrected active pen profile.

BRIEF DESCRIPTION OF DRAWINGS

FIG. 4A and FIG. 4B show example quadrature demodulations, in accordance with one or more embodiments.

FIG. 6A and FIG. 6B show examples of corrections of active pen profiles, in accordance with one or more embodiments.

FIG. 6C, FIG. 6D, and FIG. 6E show examples of adjacent values in active pen profiles, in accordance with one or more embodiments.

DETAILED DESCRIPTION

The following detailed description is merely exemplary in nature, and is not intended to limit the disclosed technology or the application and uses of the disclosed technology. Furthermore, there is no intention to be bound by any expressed or implied theory presented in the preceding technical field, background, or the following detailed description.

In the following detailed description of embodiments, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present disclosure provide input devices and methods for the sensing of touch (e.g., of a finger) and the detection of an active pen. Touch and active pen may be simultaneously present in a sensing area, and the presence of a finger or palm may cause touch interference, resulting in a degradation of the input provided by the active pen as discussed in reference to FIGS. 2 and 3. One or more embodiments of the disclosure perform operations to correct for the touch interference, thereby enabling an accurate detection of an active pen in presence of touch, in the sensing area.

Figure 1:
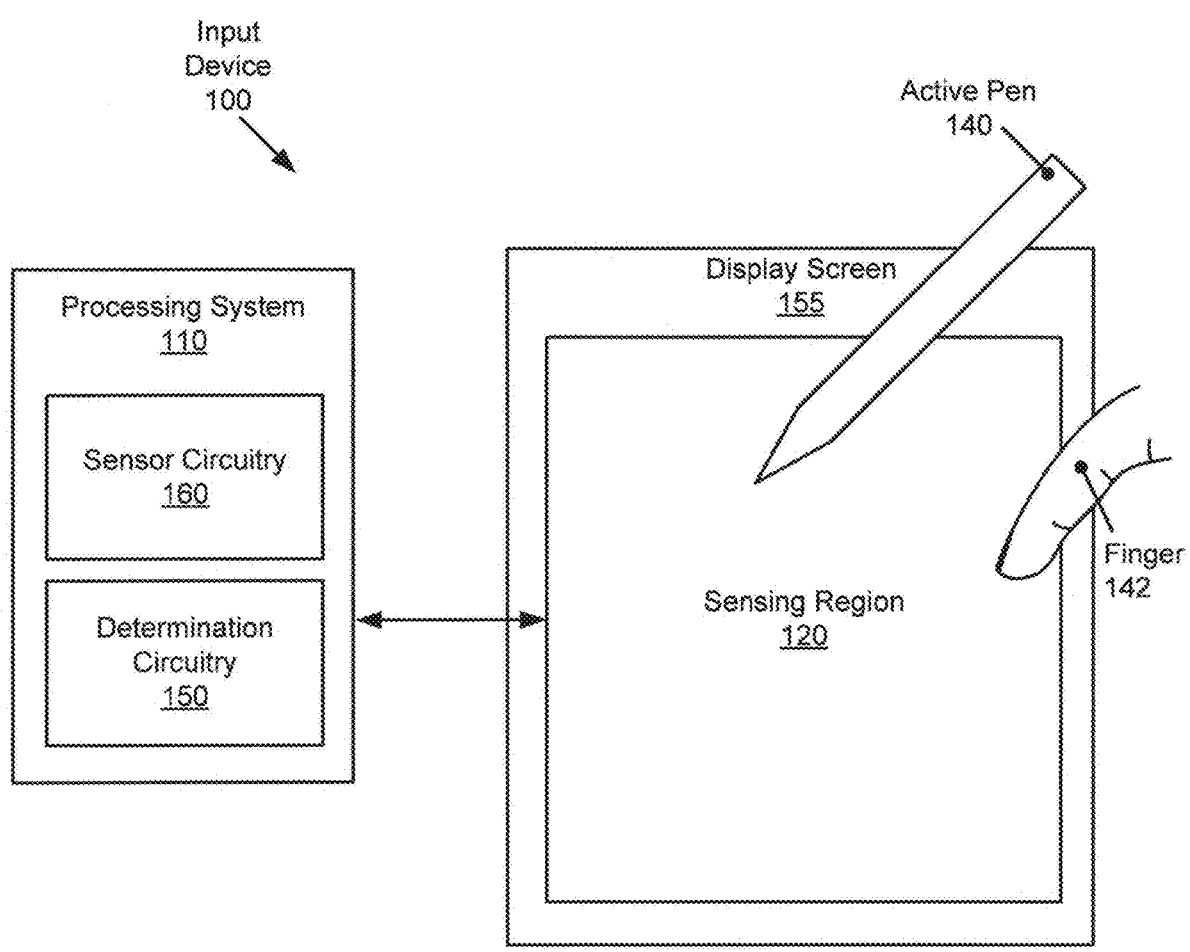
FIG. 1 shows a block diagram of an input device, in accordance with one or more embodiments.

FIG. 1 is a block diagram of an example of an input device (100), in accordance with one or more embodiments. The input device (100) may be configured to provide input to an electronic system (not shown). As used in this document, the term "electronic system" (or "electronic device") broadly refers to any system capable of electronically processing information. Some non-limiting examples of electronic systems include personal computers, such as desktop computers, laptop computers, netbook computers, tablets, web browsers, e-book readers, smart phones, personal digital assistants (PDAs), gaming devices, automotive infotainment systems, etc.

In FIG. 1, the input device (100) is shown as a proximity sensor device (e.g., "touchpad" or a "touch sensor device") configured to sense input provided by one or more input objects (140) in a sensing region (120). Example input objects include styli, an active pen, and a finger (142). Further, which particular input objects are in the sensing region may change over the course of one or more gestures.

The sensing region (120) encompasses any space above, around, in and/or near the input device (100) in which the input device (100) is able to detect user input (e.g., user input provided by one or more input objects). The sizes, shapes, and locations of particular sensing regions may vary widely from embodiment to embodiment.

The input device (100) may utilize any combination of sensor components and sensing technologies to detect user input in the sensing region (120). The input device (100) includes one or more sensing elements for detecting user input. As a non-limiting example, the input device (100) may use capacitive techniques.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitance sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may by a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter", Tx) and one or more receiver sensor electrodes (also "receiver electrodes" or "receiver", Rx). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments, the reference voltage may be system ground. In some embodiments, transmitter sensor electrodes and receiver sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

In FIG. 1, a processing system (110) is shown as part of the input device (100). The processing system (110) is configured to operate the hardware of the input device (100) to detect input in the sensing region (120). One or more of the steps described in the flowcharts of FIG. 7 and FIG. 8 may be performed by the processing system (110). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like.

The processing system (110) may be implemented as a set of modules that handle different functions of the processing system (110). For example, the processing system (110) may include determination circuitry (150) to determine when at least one input object is in a sensing region, determine signal-to-noise ratio (SNR), determine positional information of an input object, identify a gesture, determine an action to perform based on the gesture, a combination of gestures or other information, and/or perform other operations. The modules may include hardware and/or software which may execute on a processor.

The sensor circuitry (160) may include functionality to drive the sensing elements to transmit transmitter signals and receive the resulting signals. For example, the sensor circuitry (160) may include sensory circuitry that is coupled to the sensing elements. The sensor circuitry (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows determination circuitry (150) and sensor circuitry (160), alternative or additional modules may exist in accordance with one or more embodiments. Example alternative or additional modules include hardware operation modules for operating hardware such as sensor electrodes and display screens (155), data processing modules for processing data such as sensor signals and positional information, reporting modules for reporting information, and identification modules configured to identify gestures, such as mode changing gestures, and mode changing modules for changing operation modes.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g., to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

In some embodiments, the input device (100) includes a touch screen interface, and the sensing region (120) overlaps at least part of an active area of a display screen (155). For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic light emitting diode (OLED), microLED, liquid crystal display (LCD), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

While FIG. 1 shows a configuration of components, other configurations may be used without departing from the scope of the invention. For example, various components may be combined to create a single component. As another example, the functionality performed by a single component may be performed by two or more components.

Figure 2A:
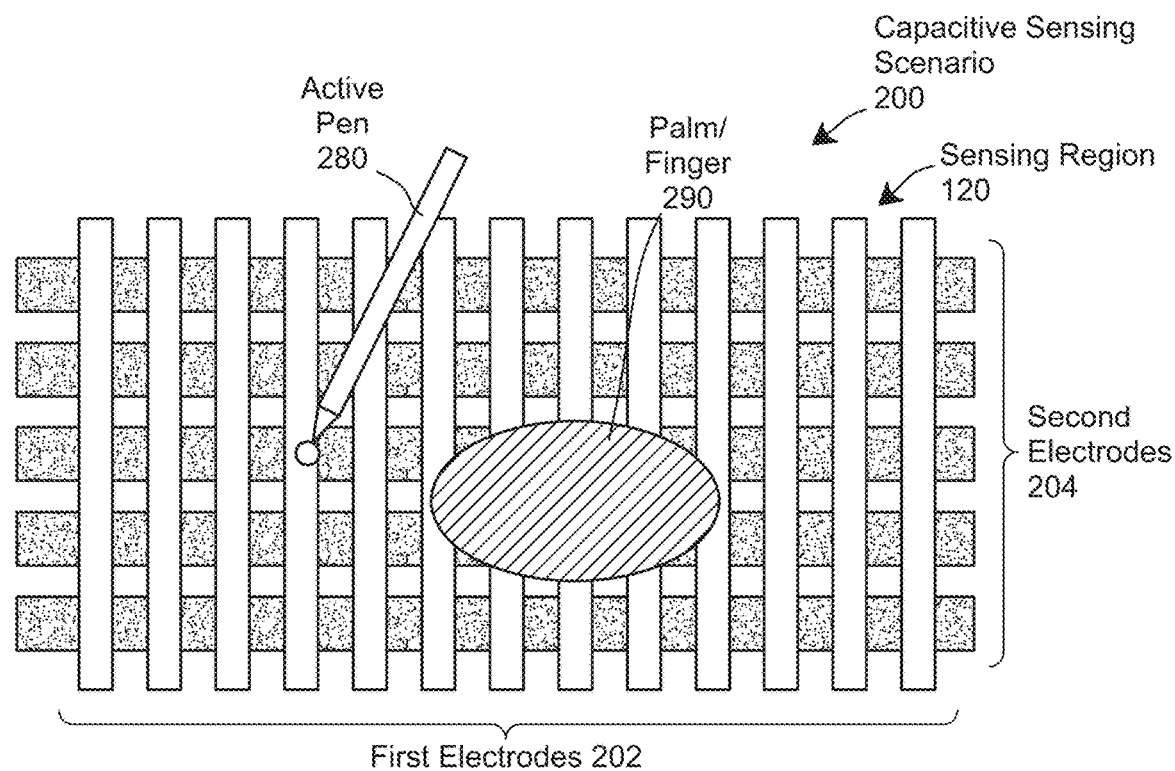
FIG. 2A and FIG. 2B show capacitive sensing scenarios in accordance with one or more embodiments.

Turning to FIG. 2A, a capacitive sensing scenario is shown in accordance with one or more embodiments. The capacitive sensing scenario (200) involves the simultaneous presence of a palm or finger (290) and an active pen (280) in the sensing region (120). Sensing operations may be performed using the first electrodes (202), aligned with a first (or vertical) axis, and the second electrodes (204), aligned with a second (or horizontal) axis, to determine the location of the palm or finger (290) and the location of the active pen (280). In the example of FIG. 2A, the first and second electrodes (202, 204) are in the shape of vertical and horizontal bars, respectively. Other electrode shapes and patterns may be used, without departing from the disclosure.

A capacitive sensing operation (e.g., absolute capacitance sensing, mutual capacitance sensing, etc.) may be performed to determine the location of the palm or finger (290).

In one or more embodiments, the first electrodes (202) and/or the second electrodes (204) are used for an absolute capacitance sensing method to localize an input object such as the palm or finger (290). A presence or absence of the palm or finger (290) near the first and/or second sensor electrodes (202, 204) alters the electric field near the sensor electrodes, thus changing the measured capacitive coupling. The change of the capacitive coupling may be measured across columns formed by the first electrodes (202) and/or across rows formed by the second electrodes (204), thereby forming absolute capacitance touch profiles. A capacitive image that may span the entire sensing region (120) may be formed by the changes of the capacitive couplings measured across the rows and columns. Other forms of capacitive sensing may be used, without departing from the disclosure. For example, a transcapacitance sensing may be used.

In one or more embodiments, the first and the second electrodes (202, 204) may be used as receiving electrodes to receive a pen signal emitted by the active pen (280). The location of the active pen (280) may be determined based on the amplitude of the pen signal received by the first and second electrodes (202, 204). Active pen profiles may, thus, be generated, analogous to the capacitive touch profiles, and the combination of the active pen profiles may form an active pen image. A direct spatial correspondence may exist between active pen profiles and capacitive touch profiles. In other words, for a value of the capacitive touch profile at a particular location, a corresponding value of the active pen profile at the same location may exist. Additional details regarding the obtaining of the location of the active pen (280) are provided below.

Figure 2B:
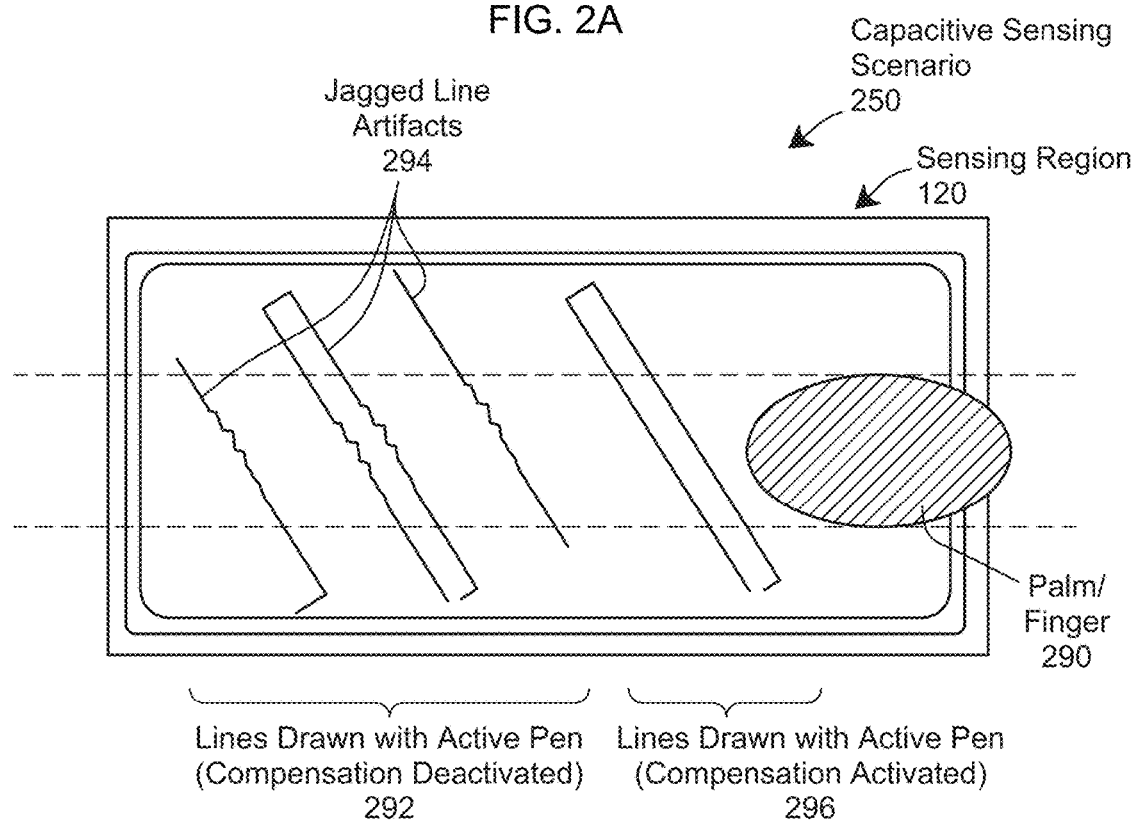

Turning to FIG. 2B, a capacitive sensing scenario, in accordance with one or more embodiments, is shown. In the capacitive sensing scenario (250), a user rests a palm or finger (290) in the sensing region (120). While the palm or finger (290) is resting in the sensing region, the user draws geometric shapes that include lines using the active pen (280). In one or more embodiments, when operating the input device (100) with an activated compensation, the lines (296) are straight, with no artifacts. However, when operating the input device (100) with a deactivated compensation, the lines (292) include jagged line artifacts (294). In the example the jagged line artifacts (294) appear in a region delimited by the two horizontal lines, in FIG. 2B. The two horizontal lines may represent the vertical extent of the touch of the palm or finger (290). Accordingly, the touch of the sensing region (120) by the palm or finger (290) may interfere with the processing of the pen signal.

Causes for the jagged line artifacts (294) are subsequently discussed in reference to FIGS. 3A and 3B. Further, the compensation for the interference by the touch is described in reference to FIGS. 3A, 3B, 4A, 4B, 5, 6A, 6B, 6C, 6D, 6E, and 7.

Figure 3A:
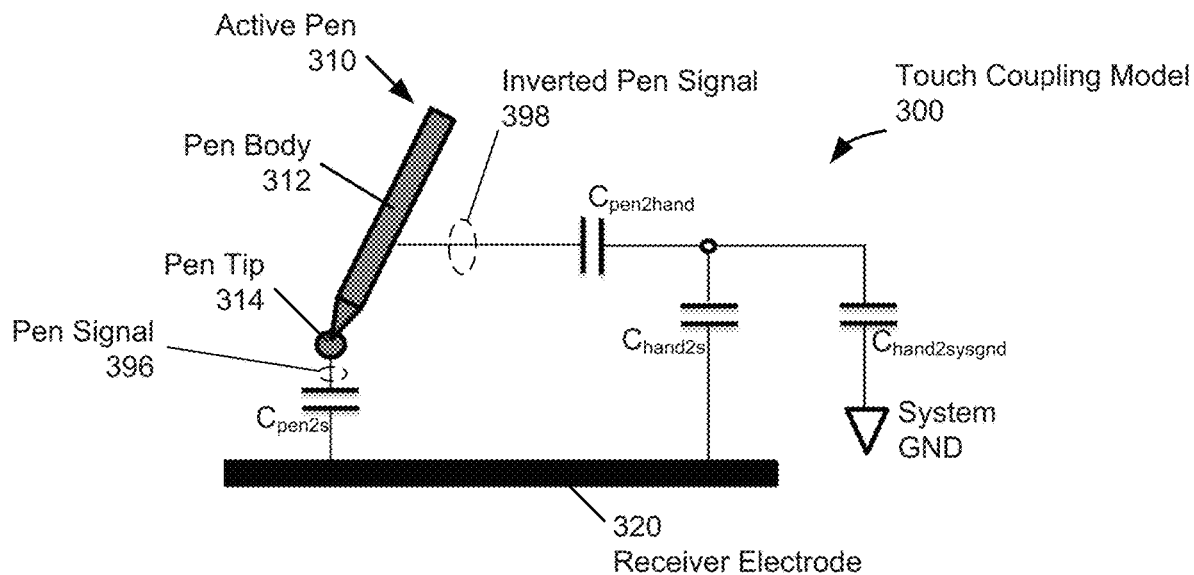
FIG. 3A and FIG. 3B show touch coupling models, in accordance with one or more embodiments.

Turning to FIG. 3A, a touch coupling model, in accordance with one or more embodiments, is shown. The touch coupling model (300) includes an active pen (310) transmitting a pen signal (396) that is received by a receiver electrode (320). The pen signal (e.g., a square wave) may be emitted at a pen tip (314). To compensate for the fluctuation of the electric potential causing the emission of the pen signal (396) at the pen tip (314), the electric potential of the pen body (312) may fluctuate inversely to the electric potential at the pen tip (314). Accordingly, the pen body (312) may emit an inverted pen signal (398).

FIG. 3A includes three capacitances to show how the pen signal (396) and the inverted pen signal (398) may be received by the receiver electrode (320). Assume that the receiver electrode (320) is one of the second electrodes (204) in FIG. 2A. More specifically, assume that the receiver electrode (320) is one of the second electrodes that is in close proximity to the pen tip (314) and the palm or finger (290, in FIG. 2A). In this case, a capacitance, $C_{pen2s}$, provides a capacitive coupling between the pen tip (314) and the receiver electrode (320). Accordingly, the pen signal (396) may couple onto the receiver electrode (320) via $C_{pen2s}$. Further, a capacitance, $C_{pen2hand}$, provides a capacitive coupling between the pen body (312) and the user's hand. A capacitance, $C_{hand2s}$, provides a capacitive coupling between the user's hand and the receiver electrode (320), and a capacitance, $C_{hand2sysgnd}$, provides a capacitive coupling between the user's hand and the system ground (GND). Accordingly, the inverted pen signal (398) may couple onto the receive electrode via $C_{pen2hand}$ and $C_{hand2s}$. As a result, the inverted pen signal (398) may interfere with the pen signal (396), on the receiver electrode (320). The degree of interference may depend on various factors, as subsequently discussed.

With a good coupling between the hand and the system GND, $C_{hand2sysgnd}$ may dominate over $C_{hand2s}$. In this case, not much of the inverted pen signal (398) may couple onto the receiver electrode (320), and the interference caused by the inverted pen signal (398) may, thus, be negligible. However, with a poor coupling between the hand and the system GND, the coupling of the inverted pen signal (398) onto the receiver electrode (320) may be non-negligible. To gain further insight into the coupling of inverted pen signal (398) onto the receiver electrode (320), the touch coupling model (300), shown in FIG. 3A, may be represented by an equivalent touch coupling model in FIG. 3B.

Figure 3B:
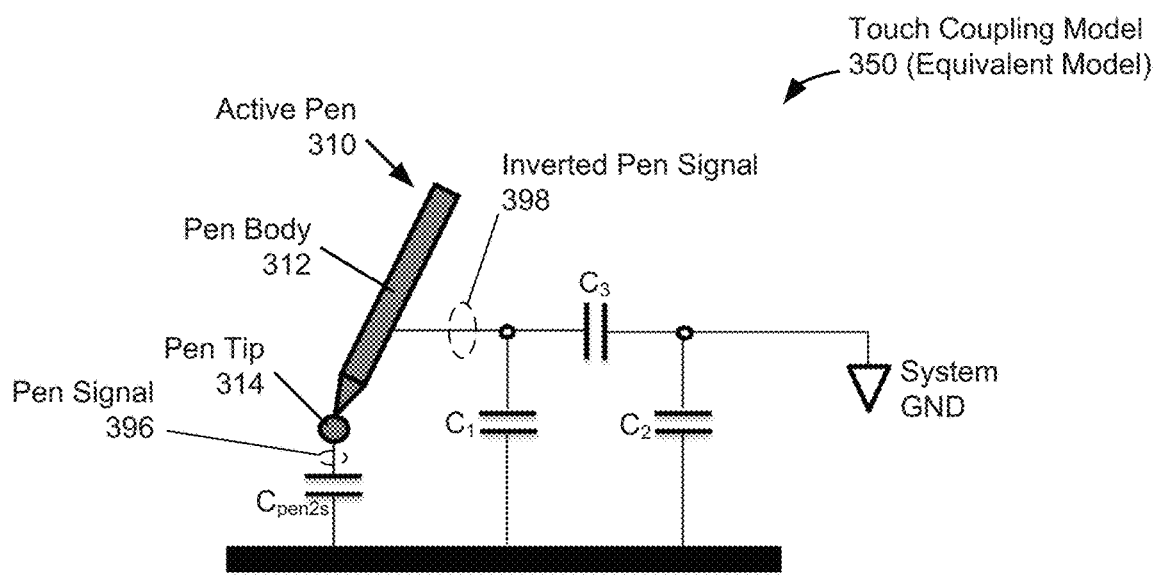

Turning to FIG. 3B, a touch coupling model (350), in accordance with one or more embodiments, is shown. The touch coupling model (350) may be understood as equivalent to the model (300) shown in FIG. 3A. $C_1$ is the equivalent capacitor responsible for the coupling of the inverted pen signal (398) onto the receiver electrode (320). $C_2$ does not provide additional coupling of the inverted pen signal (398) onto the receiver electrode (320). As a result, $C_3$ also does not contribute to the coupling of the inverted pen signal (398) onto the receiver electrode (320). With $C_1$ removed, no coupling of the inverted pen signal (398) onto the receiver electrode (320) would occur. Due to the equivalence of the circuit of FIG. 3A and the circuit of FIG. 3B, $C_1$ may be calculated as follows:

$$C_1 = \frac{C_{pen2hand} \times C_{hand2s}}{C_{pen2hand} + C_{hand2s} + C_{hand2sysgnd}}.$$

$C_{hand2s}$ may be measured, e.g., using an absolute capacitance measurement. $C_{pen2hand}$, in a first approximation, may be assumed to be constant, although some variation may exist, depending on how and where the pen is held by the user. $C_{hand2sysgnd}$ may be measured, and may, thus, also assumed to be known. Accordingly, in the above equation, $C_1$ may be calculated. $C_1$ may be expressed as a measurement of $C_{hand2s}$ in the numerator multiplied by a gain formed by the other terms of the above equation, i.e., $C_1 = \text{gain} \cdot C_{hand2s}$, where $$\text{gain} = \frac{C_{pen2hand}}{C_{pen2hand} + C_{hand2s} + C_{hand2sysgnd}}.$$

Rewritten in this form, this suggests that a correction of an active pen profile that is affected through interference by touch may be obtained through adjustment of the active pen profile using the capacitive touch profile, scaled by the gain. As the touch coupling model (300) suggests, the gain depends on $C_{hand2sysgnd}$. For a high $C_{hand2sysgnd}$, the gain approaches zero. In other words, under good ground mass conditions, the gain may be zero, or near-zero, thus providing no or little correction to obtain an accurate corrected active pen profile. However, under low ground mass (LGM) conditions, the gain may be significant, thus providing the correction to adjust the active pen profile for the presence of touch. Ground mass refers to the electrical coupling to free space (e.g., air or vacuum). Large objects, such as a human body or a vehicle, have good coupling to free space due to a large surface area for coupling. Unless connected to a power supply or sitting on a large conductive surface, a phone has much less coupling to free space due to the small size of the phone. This is often referred to as low ground mass (LGM). Thus, a phone placed on a pillow or cardboard box has very low ground mass. However, if a person holds a phone in one hand, the phone has a good ground.

Those skilled in the art will appreciate that the touch coupling models (300, 350) are simplified representations of an actual capacitive sensing scenario. Other models may model additional details and may, thus, include additional resistances, capacitances, etc., without departing from the disclosure.

The following discussion describes correcting an active pen profile that is affected by the presence of touch, in accordance with one or more embodiments. Multiple steps may be performed. Broadly speaking, (i) a capacitive touch profile is obtained, (ii) an active pen profile is obtained, and (iii) a corrected active pen profile is obtained by adjusting the active pen profile using the capacitive touch profile. The corrected active pen profile may be used to determine the position of the active pen, in the sensing region. The highest value in the active pen profile may be indicative of the position of the active pen. A spatial interpolation may be used to interpolate between adjacent values.

The capacitive touch profile may be obtained, e.g., by performing absolute capacitance sensing as previously described.

Further the active pen profile may be obtained as previously described. In one or more embodiments, the active pen signal may emit a pen signal that is not synchronized with the demodulation circuits of the input device. Accordingly, a quadrature demodulation may be performed to allow proper measurement of the amplitude of the pen signal received by the receiver electrodes of the input device.

Figure 4A:
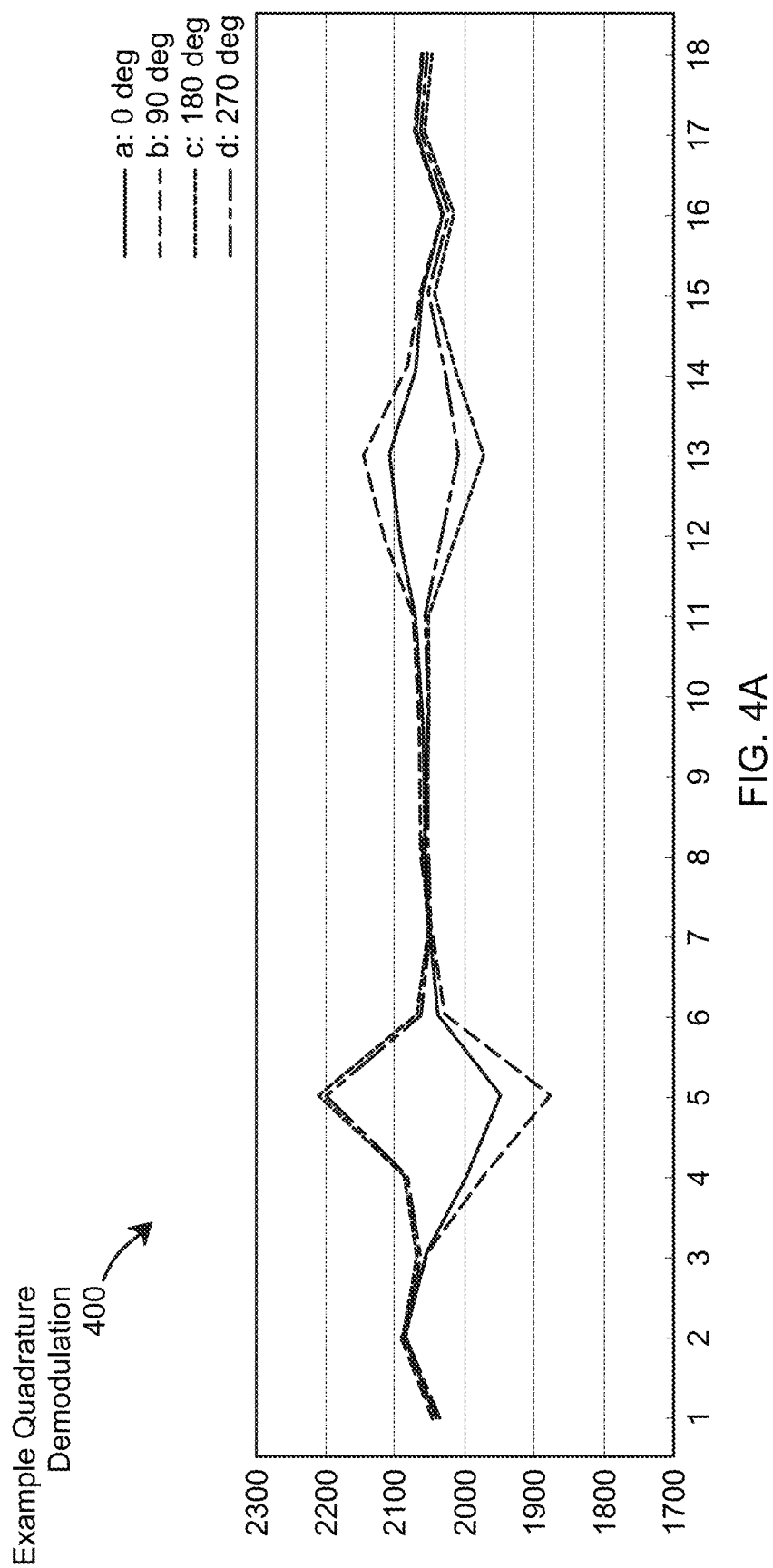

FIGS. 4A and 4B show quadrature demodulations, in accordance with one or more embodiments.

Turning to FIG. 4A, the example quadrature demodulation (400) is shown for an active pen profile over multiple receiver electrodes. At each receiver electrode, four values are obtained, using demodulation operations with different delays (0°, 90°, 180°, 270°) of the quadrature demodulation. In the example, assume that the active pen is located near receiver electrode 5, and further assume that a finger is located near receiver electrode 13. In one or more embodiments, the quadrature demodulation involves computing a single value (amplitude) for each of the receiver electrodes. Single values may be obtained by first identifying a maximum delta across all receiver electrodes. In the example, the maximum delta is found for the values obtained at a 90° delay and a 180° delay, at electrode 5. Next, the delta is computed for the delays at which the maximum delta was identified. Accordingly, in FIG. 4A, the trace for the 90° delay is subtracted from the trace for the 180° delay.

Turning to FIG. 4B, the example quadrature demodulation (450) is a result of the described operations for obtaining a single value for each of the receiver electrodes. The resulting active pen profile includes a peak at the location of the active pen (electrode 5), and preserves a dip at the location of the finger, which may represent the inverted pen signal coupled onto the electrode by the finger (electrode 13).

While a specific type of quadrature demodulation has been described, other types of quadrature demodulation may be performed, without departing from the disclosure.

Figure 5:
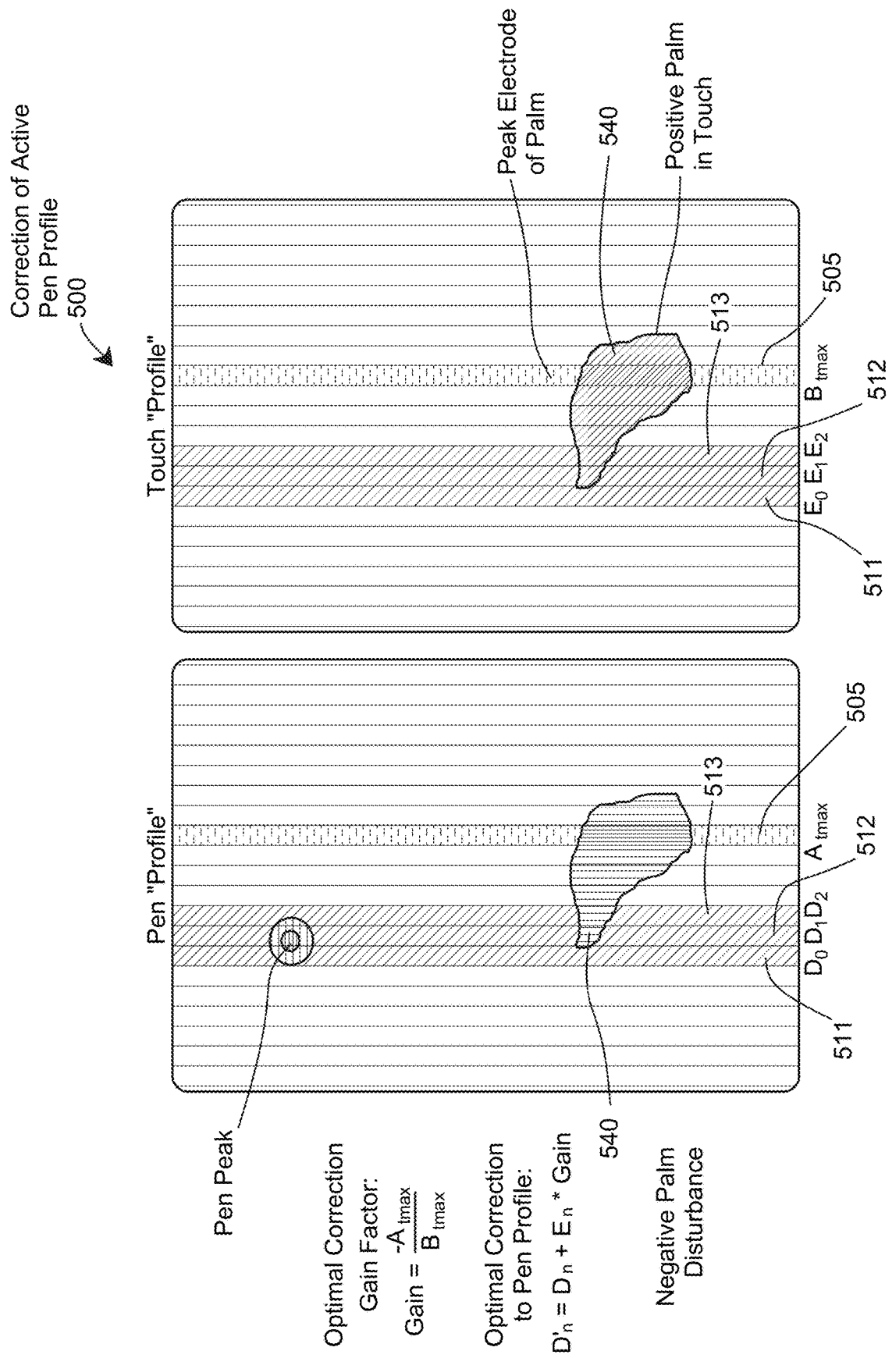
FIG. 5 shows a correction of an active pen profile, in accordance with one or more embodiments.

Turning to FIG. 5, a correction of an active pen profile (500), in accordance with one or more embodiments, is shown. The left half of FIG. 5 shows a schematic representation of a sensing region with vertically-oriented electrodes on the vertical axis in a configuration for active pen profile sensing. The right half of FIG. 5 shows a schematic representation of the sensing region with the vertically-oriented electrodes on the vertical axis in a configuration for capacitive touch profile sensing. In FIG. 5, an input object 540 in the sensing region is in contact with receiver electrodes 505, 511, 512, and 513. In an example, the input object 540 may be the palm of a user that causes a "negative palm disturbance" that extends from at least receiver electrode 511 to at least receiver electrode 505 in the pen profile (left half of FIG. 5). The input object 540 may also cause a "positive palm disturbance" that extends from at least receiver electrode 511 to at least receiver electrode 505 in the touch profile.

As previously discussed in reference to FIGS. 3A and 3B, the correction may be performed by adjusting a value of the active pen profile by adding the corresponding value of the capacitive touch profile, scaled by a gain:

$$\text{gain} = \frac{C_{pen2hand}}{C_{pen2hand} + C_{hand2s} + C_{hand2sysgnd}},$$

as previously introduced.

The gain may be identified as follows. Assume that the operation is performed for electrode n. The active pen profile value for electrode n is $D_n$. (left half of FIG. 5). Thus, the active pen profile value for receiver electrode 511 is $D_0$, the active pen profile value for receiver electrode 512 is $D_1$, and the active pen profile value for receiver electrode 513 is $D_2$. $D_0$, $D_1$, and $D_2$ represent the profile region associated with the "pen peak" location near the top of the pen profile region in the left half of FIG. 5.

The capacitive touch profile value for electrode n is $E_n$ (right half of FIG. 5). Thus, the capacitive touch profile value for receiver electrode 511 is $E_0$, the capacitive touch profile value for receiver electrode 512 is $E_1$, and the capacitive touch profile value for receiver electrode 513 is $E_2$.

A corrected active pen profile value for electrode n, $D_n'$ may be obtained by the operation $D_n'=D_n+E_n*\text{Gain}$. The gain may be determined based on profile values outside the shaded profile region D (represented by $D_0$, $D_1$, and $D_2$) in the left half of FIG. 5. By way of example, the receiver electrode 505 is outside the profile region D and has an active pen profile value of $A_{tmax}$ (see left half of FIG. 5). The receiver electrode 505 also has a capacitive touch profile value of $B_{tmax}$ (see right half of FIG. 5). Under this condition, $\text{Gain}=-A_{tmax}/B_{tmax}$.

The gain may be dynamically calculated. If the required input object (e.g., palm or finger) region is not available for updating the gain, the last known gain may be used. This may occur, for example, when the location of the pen in the active pen profile/capacitive touch profile coincides with the location of the palm or finger. Referring to FIG. 5, this would occur with the pen at the location where $A_{tmax}/B_{tmax}$ are obtained.

Figure 6A:
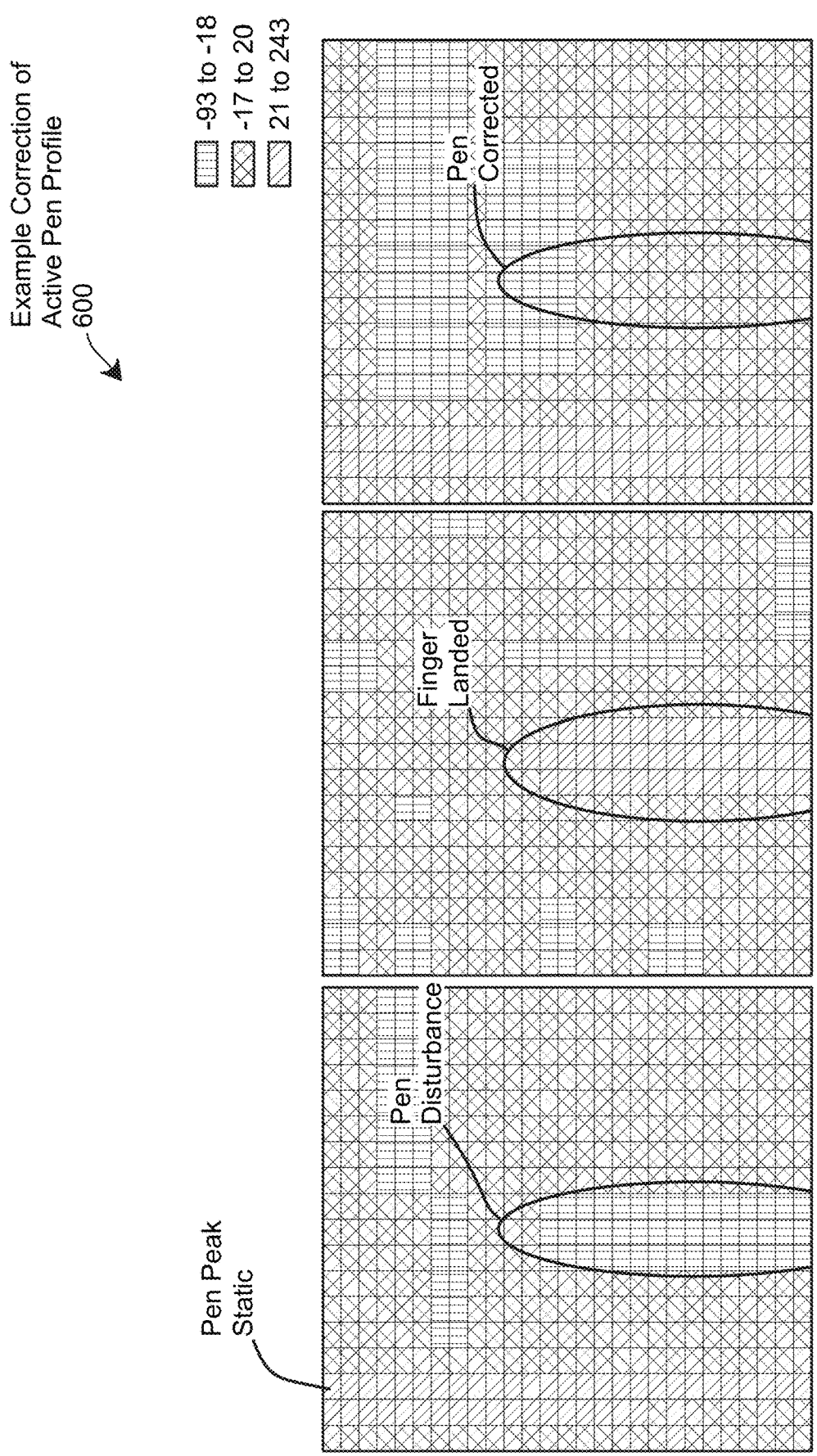

FIGS. 6A and 6B provide examples for the correction of an active pen profile, in accordance with one or more embodiments.

Turning to FIG. 6A, an example for a correction of an active pen profile (600) is provided for a scenario in which the location of the active pen does not overlap with the location of the finger. The left table shows an active pen profile over time. The center table shows a capacitive touch profile over time. The right table shows a corrected active pen profile over time. Time is in the vertical direction, i.e., the topmost rows of data values are for the earliest point in time, in the tables. Each of the columns is for one electrode. The data shown in the left, center, and right tables are for the same electrodes. All three tables provide a heatmap representation. A diagonal fill pattern indicates values above baseline (e.g., 21 to 243), a criss-cross fill pattern indicates values at baseline (e.g., −17 to 20), and a vertical fill pattern indicates values below baseline (e.g., −93 to −18).

In the active pen profile (left table), the pen is stationary. The highest values in the active pen profile are at electrode 3, and elevated values are also found at electrode 2, suggesting that the pen is stationary near electrode 3, slightly offset toward electrode 2. Over time (moving in the downward direction in the tables), a finger is placed in the sensing region. A pen disturbance is visible at the location of the finger, in the sensing region. At the location of the finger, the values of the active pen profile are depressed (below baseline), due to the coupling of the inverted pen signal onto the electrodes in proximity to the finger. However, this pen disturbance does not have a detrimental effect on the values for the location of the active pen, because there is no spatial overlap.

In the capacitive touch profile, the location of the finger is visible, once the finger is in proximity to the electrodes.

In the corrected active pen profile, the pen disturbance is successfully eliminated, while the location of the pen remains clearly visible. The correction of the active pen profile to obtain the corrected active pen profile has been performed as previously described. In the example of FIG. 6A, a fixed gain of 0.7 was used to perform the correction.

Turning to FIG. 6B, an example for a correction of an active pen profile (620) is provided for a scenario in which the location of the active pen overlaps with the location of the finger. The tables of FIG. 6B are a continuation of the tables of FIG. 6A, at a later point in time.

In the active pen profile (left table), the pen is gradually moving from left to right. Initially, the highest value in the active pen profile is at electrode 9, whereas later (bottom of the table), the highest value is at electrode 10. However, despite the gradual movement, the active pen profile does not show a smooth transition. Instead, an abrupt switch from electrode 9 to electrode 10 appears to occur, as indicated by the dashed line. The cause for the abrupt transition is the pen disturbance, which in the FIG. 6B causes interference at the actual location of the pen. FIGS. 2A and 2B illustrate such a situation, where the interference causes jagged line artifacts. The pen disturbance depresses the amplitude of the values in the active pen profile, at the pen location.

An example is illustrated in FIG. 6C, showing three adjacent values in an active pen profile (630). Because of the depressed amplitude of the values in the active pen profile, only one of the values is above baseline (dashed line). A smooth spatial interpolation between adjacent values is, thus, not possible. Accordingly, a gradual shift of the pen location from one electrode to an adjacent electrode would show as an abrupt step of the active pen position between the electrodes. The situation is minimally better in the example adjacent values in an active pen profile (640) of FIG. 6D, although two of the three values are barely above baseline. FIG. 6E illustrates a desirable scenario of example adjacent values in an active pen profile (650). As a result of all three values being noticeably above the baseline, a smooth spatial interpolation between adjacent values is possible, when the location of the active pen shifts.

Continuing with the discussion of FIG. 6B, in the capacitive touch profile (center table), the location of the finger is continuously present, at the location initially shown in the capacitive touch profile of FIG. 6A. Referring to the corrected active pen profile of FIG. 6B, as a result of the compensation, a smooth spatial interpolation between electrodes 9 and 10 is obtained, because the compensation corrects for the depression of the values in the active pen profile.

Figure 7:
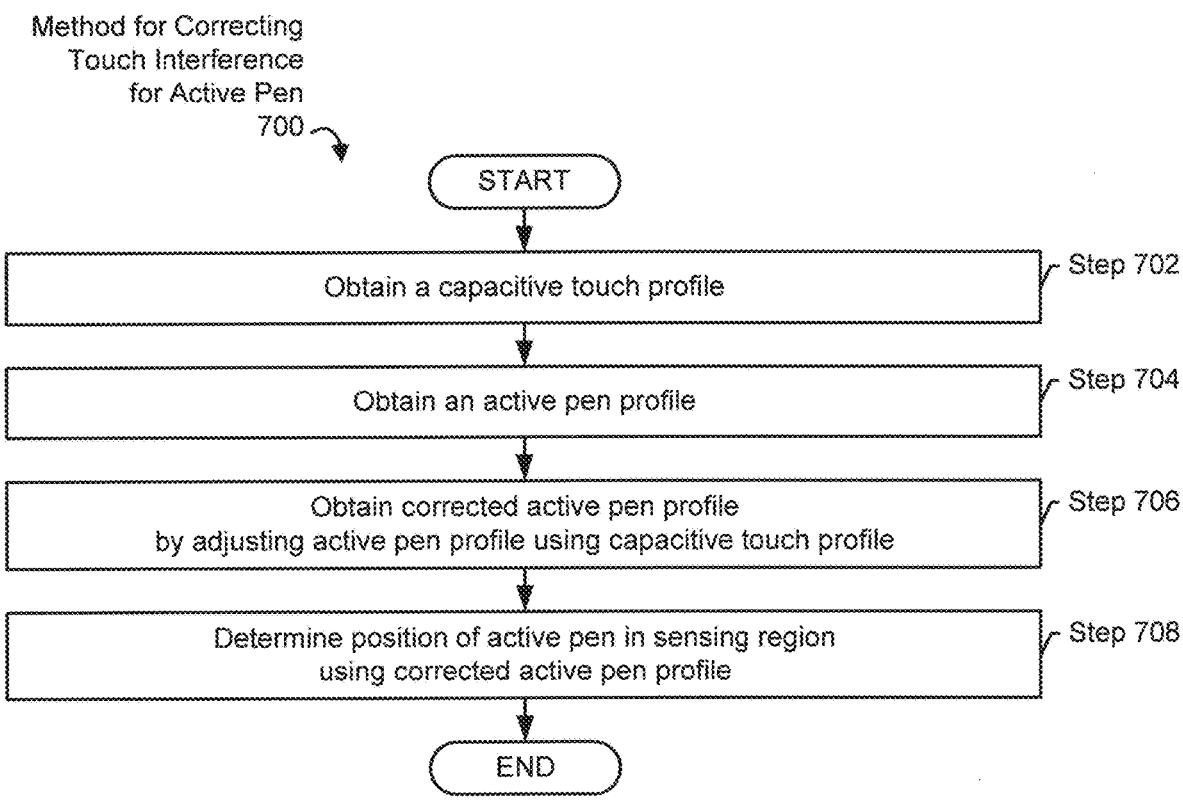
FIG. 7 shows a flowchart, in accordance with one or more embodiments.

FIG. 7 shows a flowchart in accordance with one or more embodiments. While the various steps in the flowchart are presented and described sequentially, one of ordinary skill will appreciate that some or all of the steps may be executed in different orders, may be combined or omitted, and some or all of the steps may be executed in parallel. Additional steps may further be performed. Accordingly, the scope of the disclosure should not be considered limited to the specific arrangement of steps shown in FIG. 7.

The flowchart of FIG. 7 depicts a method (700) for correcting touch interference for an active pen. One or more of the steps in FIG. 7 may be performed by the components of the input device (100). While the subsequently described steps are described for a single capacitive touch profile and a single active pen profile, the steps may be performed for multiple touch profiles to obtain an image frame. Further, the operations may be repeated over time. The described operations may also be used in presence of multiple active pens.

In Step 702, a capacitive touch profile is obtained. The capacitive touch profile may be obtained as previously described.

In Step 704, an active pen profile is obtained. The active pen profile may be obtained as previously described.

In Step 706, a corrected active pen profile is obtained by adjusting the active pen profile using the capacitive touch profile. The corrected active pen profile may be obtained as previously described.

In Step 708, the position of the active pen in the sensing region is determined using the corrected active pen profile. The position of the active pen may be obtained as previously described.

Figure 8:
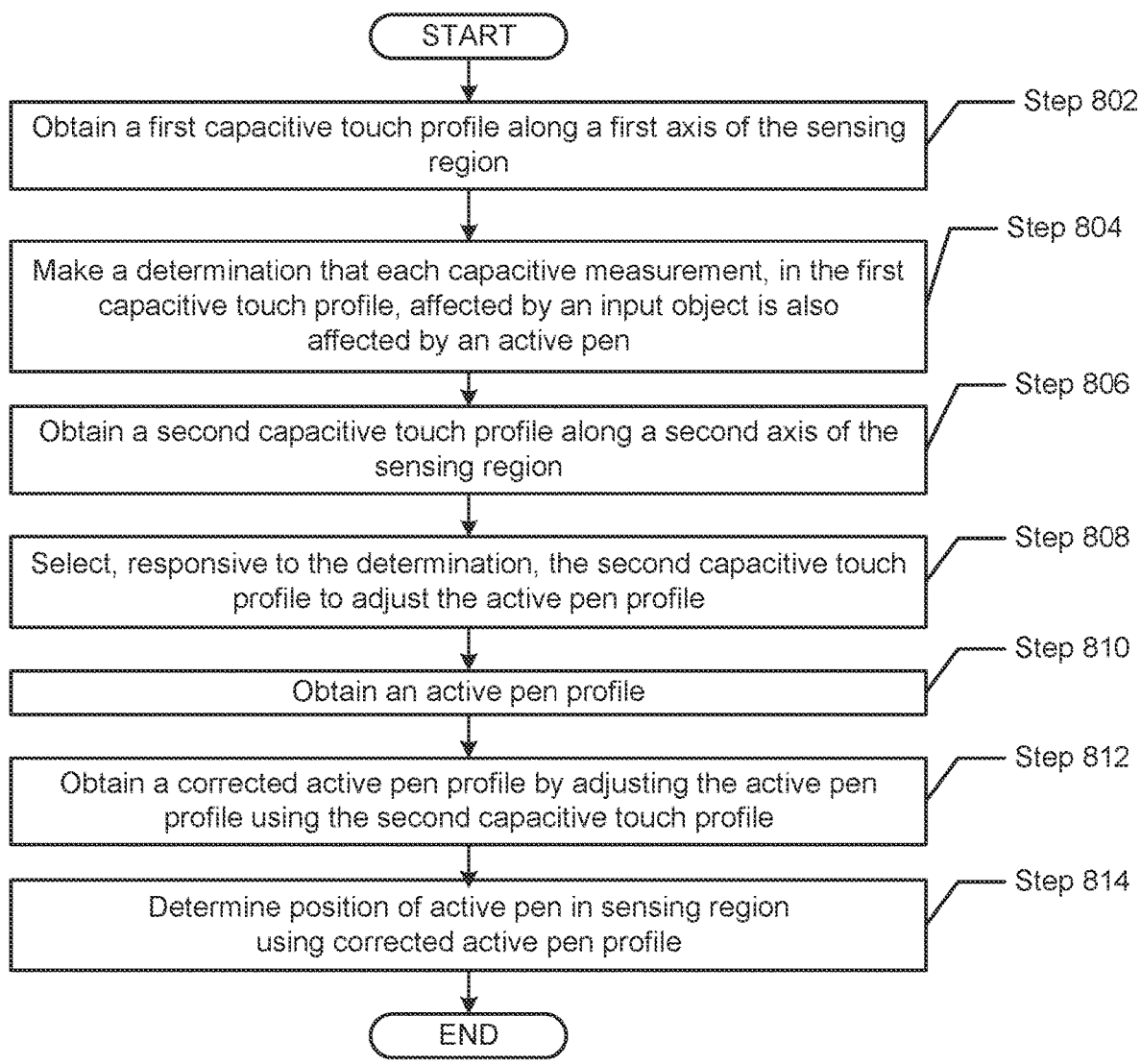
FIG. 8 shows a flowchart, in accordance with one or more embodiments.

FIG. 8 shows a flowchart in accordance with one or more embodiments. While the various steps in the flowchart are presented and described sequentially, one of ordinary skill will appreciate that some or all of the steps may be executed in different orders, may be combined or omitted, and some or all of the steps may be executed in parallel. Additional steps may further be performed. Accordingly, the scope of the disclosure should not be considered limited to the specific arrangement of steps shown in FIG. 8.

The flowchart of FIG. 8 depicts a method (800) for correcting touch interference for an active pen using multiple axes. The gain may be filtered and adjusted when optimal tuning regions (e.g., receiver electrode 505 in FIG. 5) are identified and confirmed. By way of example, tuning may not be performed if the pen is located on an edge electrode. Additionally, the tuning may be applied to electrodes on the vertical axis and to electrodes on the horizontal axis and may be used separately for each axis. If one axis is blocked from tuning for several seconds, then the other axis may provide assistance and update the gain for both axes.

One or more of the steps in FIG. 8 may be performed by the components of the input device. While the subsequently described steps are described for a single capacitive touch profile and a single active pen profile, the steps may be performed for multiple touch profiles to obtain an image frame. Further, the operations may be repeated over time. The described operations may also be used in presence of multiple active pens.

In Step 802, the input device obtains a first capacitive touch profile from multiple receiver electrodes along a first axis of the sensing region.

In Step 804, the input device makes a determination that each capacitive measurement, in the first capacitive touch profile, affected by an input object is also affected by an active pen. Because each capacitive measurement affected by the input object is also affected by the active pen, the capacitive measurements at the input object location may not be used to adjust the active pen profile on the first axis.

In Step 806, the input device obtains a second capacitive touch profile from multiple receiver electrodes along a second axis of the sensing region. The second capacitive touch profile may be obtained responsive to the determination of Step 804 or independently of the determination of Step 804.

In Step 808, the input device selects, responsive to the determination, the second capacitive touch profile to adjust the active pen profile. In one or more embodiments, the input device determines that at least one capacitive measurement at the input object location in the second capacitive touch profile is not affected by the active pen.

In Step 810, the input device obtains an active pen profile. The active pen profile may be obtained as previously described.

In Step 812, the input device obtains a corrected active pen profile by adjusting the active pen profile using the second capacitive touch profile.

In Step 814, the input device determines the position of the active pen in the sensing region using the corrected active pen profile.

In some embodiments, for the E0, E1, E2 regions on the right side of FIG. 5, projected transcapacitance profiles may be used instead of absolute sensing profiles. Similarly, for the $B_{tmax}$ electrode on the right side of FIG. 5, projected transcapacitance profiles may be used instead of absolute sensing profiles.

It is noted that scaling may be used so that one axis (vertical or horizontal) can provide a tuning value for the other axis, when the other axis is blocked and cannot update an active pen profile for a period of time. The scaling may be a ratio, for example 70%, that is known or measured in advance and may be based on phone model. For example, suppose the X axis has a tuning value of 700, the Y axis has been blocked and needs a tuning value. The X tuning value may be multiplied by 70% to get 490, which is then used by the Y axis.

Embodiments of the disclosure, thus, provide methods and systems for correcting touch interference for an active pen. While not shown, additional elements may be included. For example, in one embodiment, a state machine is configured to determine whether the method for correcting touch interference is to be performed or not. The state machine may check whether an active pen and a touch area simultaneously present in the sensing region. The state machine may execute the method, only if the simultaneous presence is detected. The state machine may otherwise skip the execution of the method, to avoid a possible introduction of artifacts by an unnecessary correction operation. An implementation of the method and system as described may further include various filtering operations. For example, a temporal filter may be applied to the active pen position to address issues that may result from the finger or palm in the sensing area moving at a high velocity. The filter, in this scenario may address a mismatch between touch sensing rates (e.g., 60 Hz) and active pen sensing rates (e.g., 240 Hz) to avoid motion artifacts in the pen trajectory.

While the invention has been described with respect to a limited number of embodiments, those skilled in the art, having benefit of this disclosure, will appreciate that other embodiments can be devised which do not depart from the scope of the invention as disclosed herein.

What is claimed is:

1. A method of capacitive sensing, comprising:
   obtaining a capacitive touch profile from a plurality of receiver electrodes disposed in a sensing region of an input device;
   obtaining an active pen profile, different from the capacitive touch profile, from the plurality of receiver electrodes;
   adjusting, using the capacitive touch profile, the active pen profile to obtain a corrected active pen profile, wherein the corrected active pen profile is obtained by adding the capacitive touch profile to the active pen profile after scaling the capacitive touch profile by a gain; and
   determining a position of an active pen in the sensing region, using the corrected active pen profile.

2. The method of claim 1, wherein obtaining the active pen profile comprises:
   receiving emissions of the active pen, by the plurality of receiver electrodes.

3. The method of claim 1, wherein obtaining the active pen profile comprises a quadrature demodulation.

4. The method of claim 1, wherein the corrected active pen profile is further obtained by:
   determining the gain based on ground mass conditions.

5. The method of claim 4, wherein a previously obtained gain is used as the gain.

6. The method of claim 1, further comprising:
   prior to the corrected active pen profile being obtained:
   determining whether a touch is present in the sensing region, in addition to the active pen, and
   based on determining that the touch is present, obtaining the corrected active pen profile.

7. The method of claim 1, wherein the capacitive touch profile is a first capacitive touch profile and is along a first axis of the sensing region, and wherein the method further comprises:
   obtaining a second capacitive touch profile along a second axis of the sensing region;
   making a determination that each capacitive measurement, in the first capacitive touch profile, affected by an input object is also affected by the active pen; and
   selecting, responsive to the determination, the second capacitive touch profile to adjust the active pen profile.

8. The method of claim 7, wherein the active pen profile is a first active pen profile and is along the first axis of the sensing region and wherein the method further comprises:
   determining the gain from the second capacitive touch profile, wherein adjusting the first active pen profile uses the gain;
   scaling the gain for the second axis to obtain a scaled gain;
   obtaining a second active pen profile along the second axis of the sensing region; and
   adjusting the second active pen profile using the scaled gain.

9. An input device, comprising:
   a plurality of receiver electrodes disposed in a sensing region; and
   a processing system configured to:
   obtain a capacitive touch profile from the plurality of receiver electrodes,
   obtain an active pen profile, different from the capacitive touch profile, from the plurality of receiver electrodes,
   adjust, using the capacitive touch profile, the active pen profile to obtain a corrected active pen profile, wherein the corrected active pen profile is obtained by adding the capacitive touch profile to the active pen profile after scaling the capacitive touch profile by a gain, and
   determine a position of an active pen in the sensing region, using the corrected active pen profile.

10. The input device of claim 9, wherein obtaining the active pen profile comprises a quadrature demodulation.

11. The input device of claim 9, wherein the corrected active pen profile is further obtained by:
    determining the gain based on ground mass conditions.

12. The input device of claim 9, wherein the processing system is further configured to:
    prior to the corrected active pen profile being obtained:
    determine whether a touch is present in the sensing region, in addition to the active pen, and
    based on determining that the touch is present, obtain the corrected active pen profile.

13. A non-transitory computer-readable medium having processor-executable instructions stored thereon, wherein the processor-executable instructions, when executed, facilitate performance of the following:

obtaining a capacitive touch profile from a plurality of receiver electrodes disposed in a sensing region of an input device;

obtaining an active pen profile, different from the capacitive touch profile, from the plurality of receiver electrodes;

adjusting, using the capacitive touch profile, the active pen profile to obtain a corrected active pen profile, wherein the corrected active pen profile is obtained by adding the capacitive touch profile to the active pen profile after scaling the capacitive touch profile by a gain; and determining a position of an active pen in the sensing region, using the corrected active pen profile.

14. The non-transitory computer-readable medium of claim 13, wherein obtaining the active pen profile comprises:

receiving emissions of the active pen, by the plurality of receiver electrodes.

15. The non-transitory computer-readable medium of claim 13, wherein obtaining the active pen profile comprises a quadrature demodulation.

16. The non-transitory computer-readable medium of claim 13, wherein the corrected active pen profile is further obtained by:

determining the gain based on ground mass conditions.

17. The non-transitory computer-readable medium of claim 13, wherein the processor-executable instructions, when executed, further facilitate performance of the following:

prior to the corrected active pen profile being obtained:

determining whether a touch is present in the sensing region, in addition to the active pen, and based on determining that the touch is present, obtaining the corrected active pen profile.

* * * * *